Figure 1:
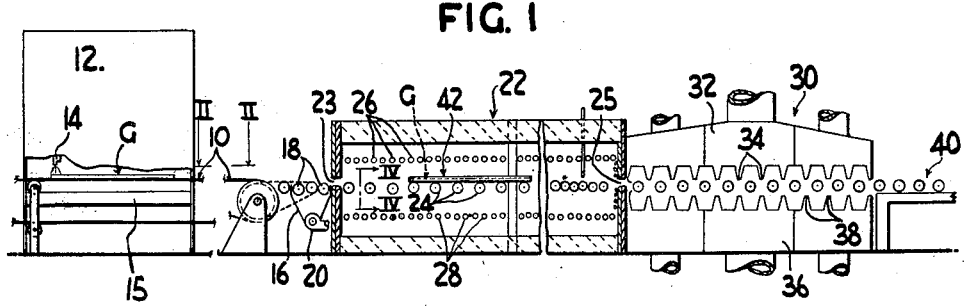

Dec. 25, 1962 S. A. SCHAFFER 3,070,459
TREATING GLASS SHEETS
Filed May 1, 1959

INVENTOR.
STANLEY A. SCHAFFER
BY *Oscar L. Spencer*
ATTORNEY

United States Patent Office 3,070,459
Patented Dec. 25, 1962

3,070,459
TREATING GLASS SHEETS
Stanley A. Schaffer, Ford City, Pa., assignor to Pittsburgh Plate Glass Company, Allegheny County, Pa., a corporation of Pennsylvania
Filed May 1, 1959, Ser. No. 810,402
5 Claims. (Cl. 117—119.6)

This invention relates to treating glass sheets, and specifically refers to the art of coating glass sheets, wherein a glass sheet is supported in a horizontal plane while a coating is applied to its upper surface and the coated sheet is subsequently heated to a temperature sufficient to fuse the coating material onto its upper surface.

Temperature control is extremely important when glass sheets are coated with frit and subsequently heated to fuse the frit onto their surface. The surfaces of the glass sheet must be at a temperature sufficiently high to cause the frit to fuse. At the same time, the temperature throughout the thickness of any glass sheet must be above its annealing point and below its softening point. On the one hand, it is necessary to heat the glass sheet at least to its annealing point so that the glass will not be subjected to chill cracking. On the other hand, if the glass is heated too high, it becomes subject to distortion.

It is especially important that the temperature gradient at the surface to be coated be maintained as small as possible. Unless special steps are taken, it is especially difficult to maintain a small thermal gradient about the periphery of the glass. Sharp thermal gradients spoil the color uniformity of the frit coating because when the glass surface temperature is not uniform, the coldest portion of the surface must attain the frit softening point. This causes the hotter portions to exceed the minimum required temperature and the glass base softens to produce a wavy effect in the coated product or certain frits strike to different colors at different temperatures to produce a mottled color rather than a desired solid color.

The temperature gradients of the leading and trailing edges of the glass sheets have been controlled by having the glass sheets closely adjacent to each other as they move through the furnace. This temperature uniformity along the path of sheet movement has not been appreciated as resulting from the proximity of the sheets to each other, because close spacing between sheets is needed for maximum production rates, since any gap between adjacent sheets results in that much loss in effective length of the furnace.

According to the present invention, it has been found necessary to flank the side edges of each glass sheet with a shield having thermal capacity per unit area substantially equal to that of the glass sheet while the glass sheet is conveyed through the furnace. The shields serve as heat absorbers and prevent a concentration of heat along the side edges of the glass sheet. Therefore, the surface temperature gradients transversely of the glass sheet movement are maintained substantially uniform as the sheets are conveyed through the tunnel-like furnace where the coating compositions are baked onto the upper surface of the sheet.

The conveyor used to convey the glass sheet comprises a cable conveyor, comprising spaced cables extending between pulleys located before and beyond a coating station, for transporting the glass sheets through the coating station; and a roller conveyor comprising a series of laterally and horizontally disposed rolls, for transporting the glass sheets through heat treatment apparatus. The latter comprises a tunnel-like furnace and a chilling apparatus that includes opposing nozzles for blasting a chilling fluid to opposite surfaces of the heated coated glass sheets.

Since sheets of different widths are handled by the apparatus, it is obvious that portions of the cable conveyor flanking narrower sheets become covered with spray at the spray station, whereas larger sheets cover these cables. When sheets of various sizes are produced, some cables are sometimes shielded and sometimes exposed. Shields constructed according to the present invention are mounted to flank the coated glass sheets just before the latter enter the furnace.

The shields are specially constructed to prevent any transfer of coating composition from the cables that are sometimes exposed to spray to portions of the furnace conveyor rolls by means of the bottom surface of the shields. This special construction includes a main central portion which extends longitudinally of the shield, a connector portion extending downwardly therefrom at each longitudinal side edge thereof and longitudinally extending legs extending transversely from the bottom of each connector portion.

The legs ride on the conveyor rolls and also serve to maintain the under surface of the main body portion in spaced relation from the conveyor rolls of the tunnel-like furnace. The glass sheets are mounted on the cable conveyor so that their side edges terminate in vertical planes out of alignment with cables. The shields are mounted at the terminal portion of the cable conveyor to flank the glass sheet in positions such that the cables support the bottom surface of the longitudinally extending main portion of each body and the legs extend between and below adjacent cables of the cable conveyor.

The bottom surface of the shields flanking the glass sheets are lifted into spaced relationship from the rollers of the furnace conveyor by the legs supporting the shields on the conveyor rolls. Thus, any coating composition transferred from a cable of the conveyor onto the bottom surface of the shield is not transferred onto the rolls of the roller conveyor in the furnace because the bottom surface of the shields contacting the cables is kept out of contact with the rolls of the roller conveyor.

The present invention will be understood more clearly after studying the details of an illustrative embodiment which follows. The purpose of the description is for illustration rather than limitation. Reference to the latter may be obtained by studying the claims accompanying this disclosure.

Figure 2:
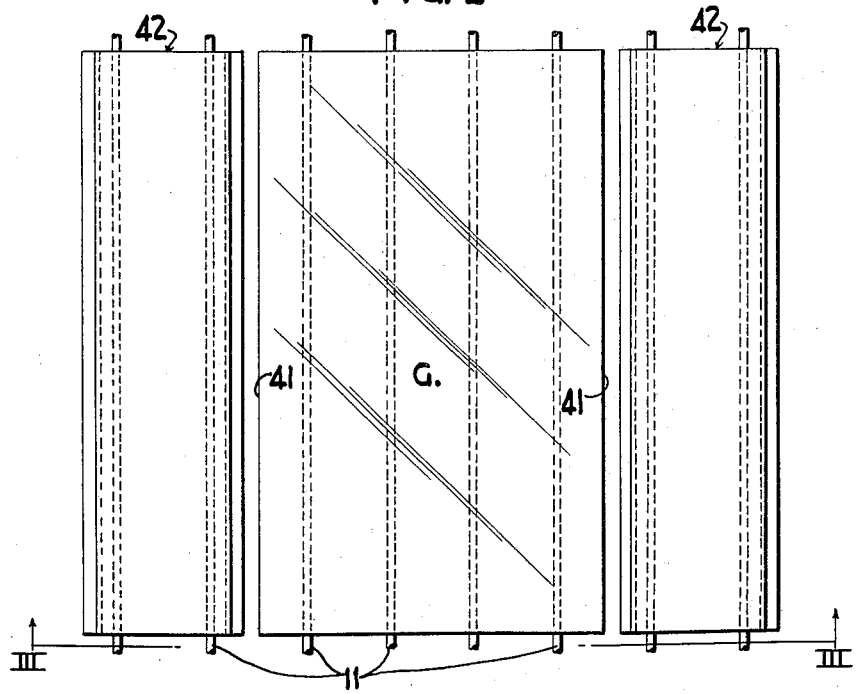
Figure 3:
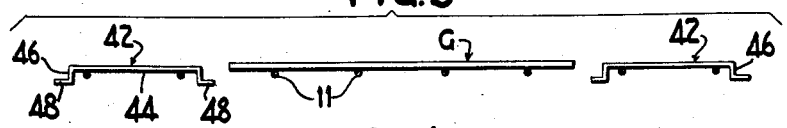
Figure 4:
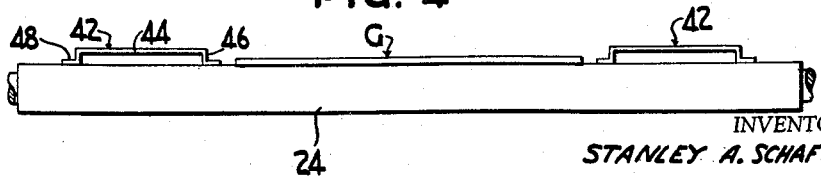

In the drawings forming part of the present description,
FIGURE 1 is a fragmentary longitudinal elevation view partly in section of glass coating and heat treating apparatus requiring the present invention.
FIGURE 2 is a plan view along the lines II—II of FIGURE 1.
FIGURE 3 is a sectional view along the lines III—III of FIGURE 2 and FIGURE 4 is a sectional view along the lines IV—IV of FIGURE 1.

Referring to the drawings, and especially FIGURE 1, reference number 10 refers to a cable conveyor including a plurality of substantially parallel cables 11 entrained about parallel pulleys and extending through a spray station 12. The latter includes a spray gun 14 disposed over the path of movement taken by glass sheets G along the cable conveyor, and a catch pan 15 located between the upper and lower runs of cable conveyor 10 to collect coating composition for salvage and to shield the cables 11 from receiving a spray of coating composition on their return run. This shielding is important because the coating composition becomes hard in the time it takes a cable to move through its complete cycle of movement. Therefore, the problem of transferring the wet coating composition, which is present along the forward run of the cable conveyor 10 is eliminated by the passage of time consumed in a complete cycle of movement of the cable conveyor.

The spray guns are disposed to apply a coating material to the upper surface of a glass sheet passing thereunder.

The coating material may be in the form of colored enamel frits applied in a suspension containing water, alcohol, diethylene glycol which serves as a thickening agent, sodium nitrite which serves as a suspension agent, and sodium pyrophosphate which serves as a dispersion agent. Typical compositions are formed by mixing from 30 to 70 cubic centimeters of water, 70 to 27 cubic centimeters of methyl alcohol, 2 percent to 10 percent by volume of diethylene glycol, .09 percent to .12 percent of solids by weight of sodium nitrite, between .05 percent to .11 percent of solids by weight of sodium pyrophosphate and from about 150 to 250 grams of ground coloring frits dispersed within the above vehicle. The frits are preferably milled to a particle size of less than 200 mesh and introduced into the liquid vehicle formed by mixing the other ingredients.

At the end of the cable conveyor 10, where the shields are mounted, a funnel 16 including rotatably driven brushes 18 is located below the upper run of cables 11. The brushes 18 extend transversely of the cable conveyor in such a manner that the tips of the brush bristles flick any dirt or overspray that might remain on the bottom surface of a coated glass sheet. A vacuum pump 20 is operated to remove any material flicked from the glass under surface.

Beyond the cable conveyor 10 is a furnace 22 or lehr beginning at an entrance slot 23. Conveyor rolls 24 extend across the furnace in longitudinally spaced positions to provide an extension of the cable conveyor 10 extending through an exit slot 25 and also through a cooling chamber 30.

The furnace 22 is provided with upper heaters 26 above the path the glass sheet is driven by rotation of conveyor rolls 24 and also bottom heaters 28 located below the path of movement of the conveyor rolls 24 through furnace 22. The purpose of the upper heaters 26 and the bottom heaters 28 is to heat the glass sheets according to a predetermined pattern along the path of movement. The upper heaters 26 also serve to fuse the coating material onto the upper glass surface. The particular sequence of heating the glass is disclosed and claimed in pending application Serial No. 663,834 of William O. Lytle, filed June 5, 1957, now abandoned, entitled "Treating Glass Sheets."

The cooling chamber 30 which is located beyond the exit slot 25 of the furnace 22 comprises one or more upper plenums 32 terminating in downwardly directed nozzles 34 directing blasts of chilling fluid against the upper surface of the glass sheet passing therethrough. One or more lower plenums 36 terminating in upwardly directed nozzles 38 are provided to impart chilling blasts of air upwardly onto the bottom surface of the glass sheets passing through the cooling chamber 30. The plenums 32 and 36 are located so that nozzles 34 and 38 flank the conveyor portion traversing the cooling chamber 30. A run-out conveyor section 40 is provided for removing the coated glass sheets after completion of the treatment.

It is necessary that the side edges 41 (FIGURE 2) of each glass sheet G be maintained at substantially the same surface temperature as the remainder of the surfaces of the glass sheet. This is accomplished by flanking the glass sheets with shields 42, each being a body having a thermal capacity per unit area substantially equal to that of an equivalent area of glass sheet G. Each shield 42 comprises a longitudinally extending main body portion 44 and a pair of connector portions 46 extending downwardly from each longitudinal side edge of the main body portion. Longitudinally extending legs 48 extend transversely from the bottom of each connector portion 46.

FIGURE 2 shows that the shields 42 are mounted on the cable conveyor to flank the glass sheets in position such that the cables 11 support the bottom surface of the longitudinally extending main portion 44 of each body 42 and the legs 48 extend between and below adjacent cables 11 of the cable conveyor 10. The method of supporting the bodies 42 on the cable conveyor is shown in elevation in FIGURE 3.

When the glass sheets and the shields 42 reach the roll conveyor for transport through furnace 22, the shields 42 are lifted. Legs 48 support the shields 42 so that the under surface of their main central portion 44 is maintained out of contact with the conveyor rolls 24.

The thermal capacity of shields 42 serves to maintain the ambient atmosphere in the vicinity of the side edges 41 of the glass sheets substantially equal to that of the remaining atmosphere by absorbing an amount of heat substantially equal to that absorbed by an equivalent area of glass. This results in no undue heating of the side edges of the glass which would normally cause the side edges 41 to soften and curl. Therefore, the present invention also avoids a mottled or non-uniform appearance in the spandrel panel resulting from unequal heating of the glass during the coating and heat treatments described.

While colored enamel frits have been mentioned in passing in the description of an illustrative embodiment of the present invention, it is also understood that the apparatus is susceptible for use in coating glass with many other compositions, such as aluminized compositions, combinations of coatings, such as metalized coatings and ceramic coatings, colored, uncolored, clear and opaque.

By keeping the conveyor rolls 24 of the furnace conveyor free from coating compositions, the controls for the heating elements 26 and 28 are more accurate than those obtained with a roll that becomes coated in streaks with a composition different from the stainless steel composition along lines parallel to some of the cables 11, especially those outboard cables which are sometimes covered and sometimes exposed.

Also, by avoiding any transfer of coating material onto the furnace conveyor rolls by way of the shields, glass sheets of various widths can be treated in the apparatus without having their under surfaces streaked with coating material because of further transfer of the coating material from the furnace conveyor rolls to the portions of the glass sheets conveyed over any streaked portions.

The bodies 42 are preferably formed of stainless steel compositions having a thickness on the order of one half the thickness of the glass sheets that are passed through the apparatus. However, the thickness can vary substantially as long as the thermal capacity per unit of the shields 42 is of the order of magnitude of that of an equivalent area of glass sheet. A difference of as high as 25 percent in thermal capacity per unit area of shield versus glass is acceptable for production purposes within the teachings of the present invention.

The width of the shields 42 is chosen to be sufficiently narrow to flank the widest sheets to be treated in the coating apparatus and still permit the glass sheet and its flanking shields to fit within the tunnel-like furnace. The coating deposited on the exposed cables supporting a shield is not transferred to the furnace conveyor rolls because of the legs 48 supporting the main body portion 44 of shields 42 in spaced relation to the furnace conveyor rolls regardless of the width of the glass sheets flanked by the shields. When the shields flank narrow glass sheets, there is no contact between the outermost cables of the cable conveyor and the shields. Therefore, there is no possibility of transfer of coating composition onto the outermost portions of the conveyor rolls through the bottom surface of the shields.

What is claimed is:

1. In the art of coating glass sheets wherein a glass sheet is disposed in a substantially horizontal plane while its upper surface is covered with a coating material and the coated glass sheet is heated to a temperature sufficient to fuse the coating material onto its upper surface, the improvement comprising flanking the glass sheet along its side edges substantially in said plane with adjacent bodies having thermal capacity per unit area substantially equal to that of the glass sheet and maintaining said adjacent bodies in flanking relation to substantially the entire length of the side edges of the glass sheet while the latter is subjected to its heating.

2. In the art of coating glass sheets wherein a glass sheet is conveyed horizontally while disposed in a substantially horizontal plane and while its upper surface is covered with a coating material and the coated glass sheet is heated to a temperature sufficient to fuse the coating material onto its upper surface, the improvement comprising flanking the glass sheet along its side edges substantially in said plane with adjacent bodies having thermal capacity per unit area substantially equal to that of the glass sheet and conveying said adjacent bodies in flanking relation to substantially the entire length of the side edges of the glass sheet while the latter is subjected to its heating.

3. Apparatus for handling glass sheets comprising a coating station, a tunnel-like furnace beyond said coating station and a horizontally extending conveyor for transporting glass sheets through said coating station and said tunnel-like furnace along a horizontal path and for supporting said glass sheets in a substantially horizontal plane during said transport, wherein the horizontally extending conveyor comprises a cable conveyor extending through and beyond said coating station and a roller conveyor extending through said tunnel-like furnace and shields having thermal capacity per unit area substantially equal to that of the glass sheets flank each side edge of the glass sheets and occupy positions substantially in said plane adjacent to and along substantially the entire length of each said side edge during passage of the glass sheets through said furnace, wherein said shields each are in the form of a channel comprising a longitudinally extending main body portion, a connector portion extending downwardly therefrom at each longitudinal side edge thereof and longitudinally extending legs extending transversely from the bottom of each said connector portion, said legs serving to maintain the main body portion in spaced relation from said conveyor rolls of said tunnel-type furnace.

4. Apparatus as in claim 3, wherein said shields are mounted on the cable conveyor portion beyond said coating station in positions such that the cables support the bottom surface of the longitudinally extending main body portion of each shield and the legs extend between and below adjacent cables of the cable conveyor.

5. In the art of coating glass sheets wherein a succession of glass sheets is conveyed horizontally and each sheet is disposed in a substantially horizontal plane with its leading edge adjacent to the trailing edge of a preceding sheet and is subjected in turn to elevated temperatures sufficient to form a permanent coating on its upper surface from a material deposited thereon and wherein the uniformity of a characteristic of the coating is dependent upon the temperature uniformity of the coated surface at said elevated temperatures, the improvement comprising flanking each glass sheet along substantially the entire length of its side edges with adjacent bodies having thermal capacity per unit area substantially equal to that of the glass sheet and conveying said adjacent bodies in flanking relation to substantially the entire length of the side edges of the glass sheet while the latter is subjected to said elevated temperatures.

References Cited in the file of this patent
UNITED STATES PATENTS

| | | |
|---|---|---|
| 2,194,611 | Paddock et al. | Mar. 26, 1940 |
| 2,248,714 | Lytle | July 8, 1941 |
| 2,264,244 | Lytle | Nov. 25, 1941 |
| 2,348,278 | Boyles et al. | May 9, 1944 |
| 2,452,488 | Paddock et al. | Oct. 26, 1948 |
| 2,646,647 | Bramford et al. | July 28, 1953 |
| 2,903,825 | Richardson | Sept. 15, 1959 |